Nov. 29, 1955    J. F. MARTIN    2,725,128
VACUUM OPERATED EMERGENCY BRAKE
Filed July 20, 1954    2 Sheets-Sheet 2
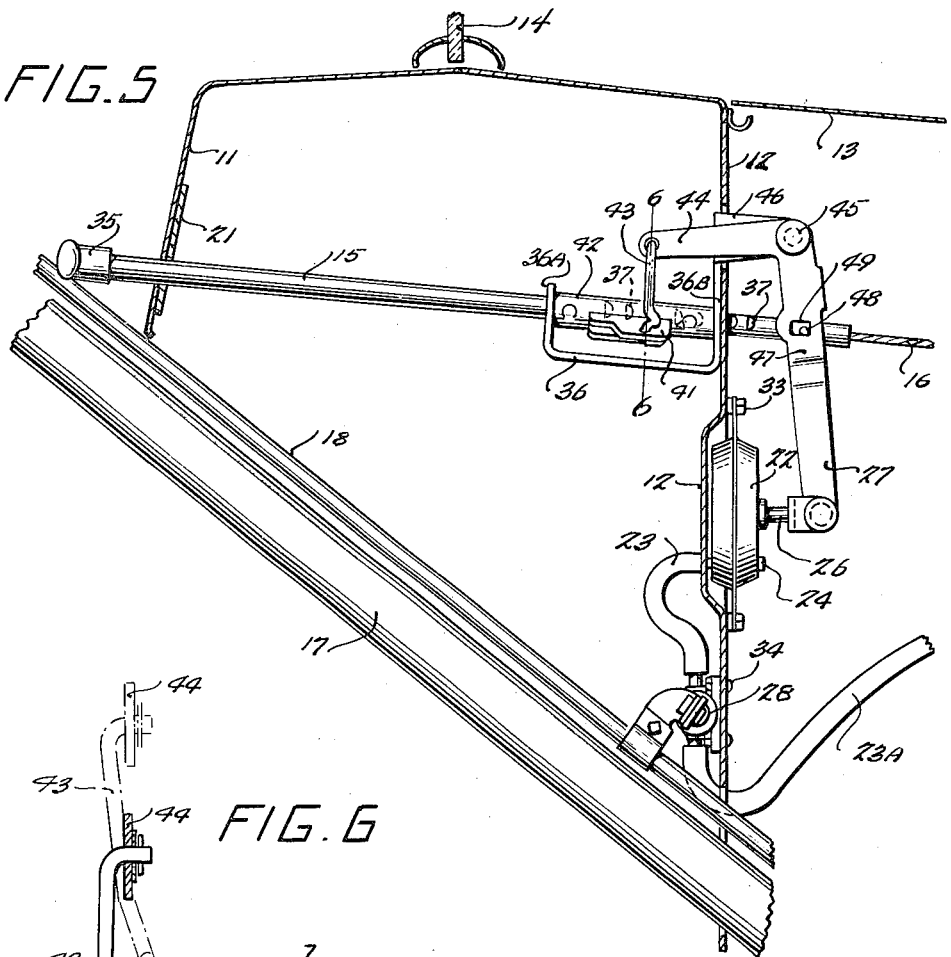
INVENTOR.
JOSEPH F. MARTIN
BY Edward M. Apple
ATTY

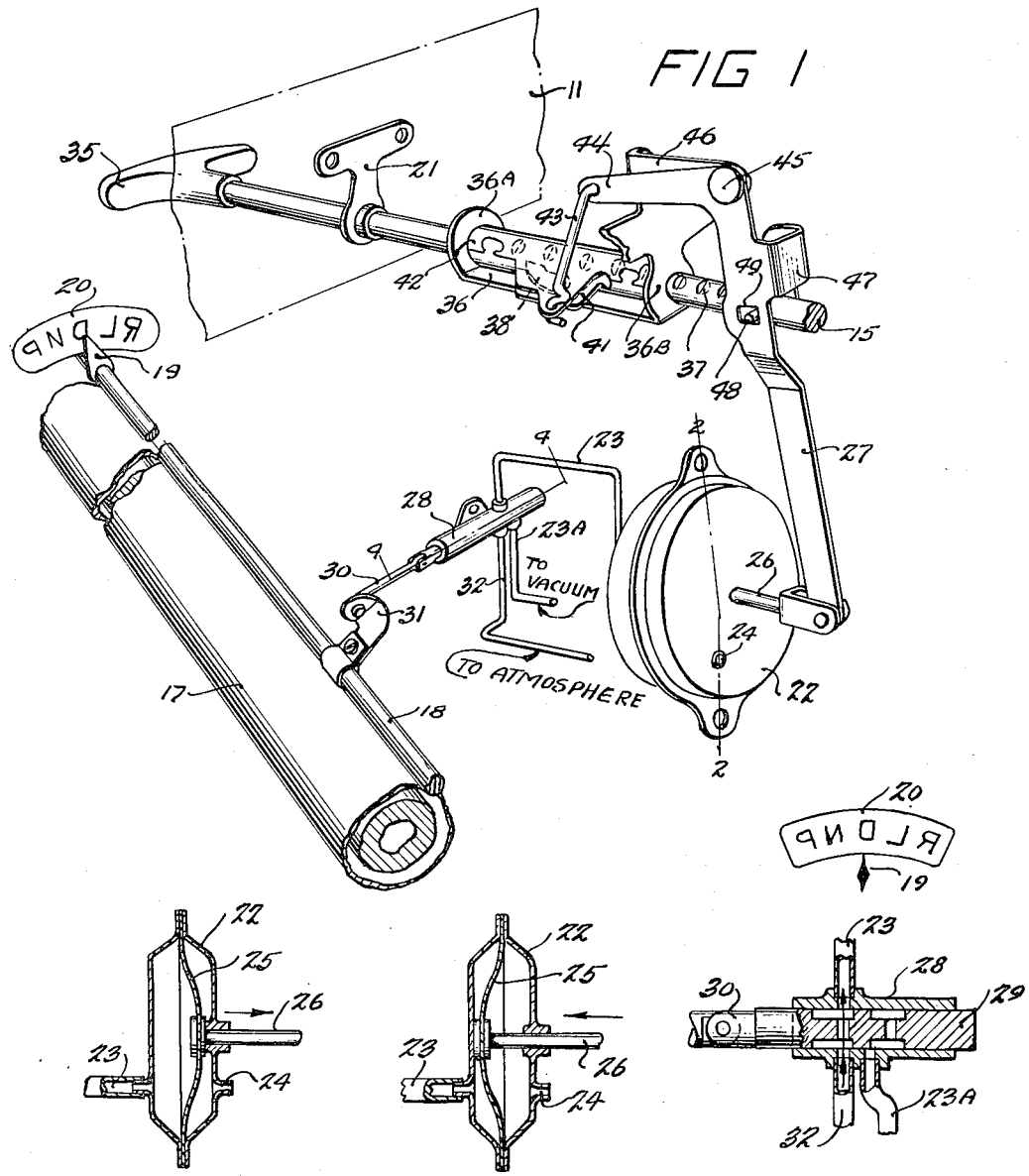

United States Patent Office 2,725,128
Patented Nov. 29, 1955

2,725,128

VACUUM OPERATED EMERGENCY BRAKE

Joseph F. Martin, Detroit, Mich.

Application July 20, 1954, Serial No. 444,442

5 Claims. (Cl. 192—4)

This invention relates to automotive devices, and has particular reference to a device for automatically engaging and releasing the emergency brake of a motor vehicle.

An object of this invention is to generally improve devices such as disclosed in Patent No. 2,656,025, issued to me on October 20, 1953.

Another object of the invention is to provide an automatic mechanism for engaging and disengaging the emergency brake, which may readily be installed on old or new motor vehicles, such as are equipped with conventional emergency brake mechanisms, gear shift levers, or automatic transmissions.

Another object of the invention is to provide means for engaging the emergency brake simultaneously with the changing of the position of the transmission speed selector mechanism or the conventional gear shift lever positioned on the steering column.

Another object of the invention is to provide automatic power means which engage the emergency brake mechanism, which power means are controlled by the manual operation of selecting a predetermined position in the automatic transmission mechanism, without in any way interfering with the normal functioning of the automatic transmission.

Another object of the invention is to provide a vacuum power mechanism, which is connected to the engine manifold, for automatically engaging and disengaging the vehicle emergency brake, when certain positions are selected by the gear shift lever or indicated on the speed selector mechanism.

The foregoing and other objects and advantages of the invention will become more apparent as the description proceeds, reference being made from time to time to the accompanying drawing, in which drawing:

Fig. 1 is a perspective view of a mechanism embodying the invention, and illustrates the power operated elements in relation to the hand brake rod, the vehicle steering column and the speed selector mechanism.

Fig. 2 is a section taken substantially on the line 2—2 of Fig. 1, and illustrates the position of the diaphragm in the vacuum cylinder, when the emergency brake is in released position.

Fig. 3 is a section taken through the vacuum cylinder, similar to the view shown in Fig. 2, but illustrates the position of the diaphragm in the vacuum cylinder, when the emergency brake is in set position.

Fig. 4 is an enlarged fragmentary detail, in section taken substantially on the line 4—4 of Fig. 1, and showing the interior of the vacuum control valve.

Fig. 5 is a fragmentary section taken through a portion of a motor vehicle body and illustrates the mechanism embodying the invention mounted on the fire wall, instrument panel, and steering column of the vehicle.

Fig. 6 is a section taken substantially on the line 6—6 of Fig. 5, and illustrates the hand brake rod and locking ratchet control mechanism in two positions.

Fig. 7 is an enlarged fragmentary plan view of the hand brake rod and locking ratchet control mechanism.

Referring now more particularly to the drawing, it will be understood that in the embodiment herein disclosed, the reference character 11 indicates the rear of the instrument panel of a motor vehicle to which is mounted part of the mechanism embodying the invention. In Fig. 5, I illustrates the mechanism mounted on the fire wall 12 of the motor vehicle beneath the hood 13 and the wind shield 14. The reference character 15 indicates the emergency hand brake rod to which is secured the cable 16, which extends to the emergency brake mechanism (not shown). The reference character 17 (Fig. 1) indicates the steering column of the vehicle on which is mounted the speed selector rod or lever 18 having secured thereto a pointer 19 which is adapted to indicate on the panel 20 the gear changes and speeds as in conventional practice.

It will be understood that the emergency brake hand rod 15 is normally urged into released position by means of a spring (not shown) which comprises part of the emergency brake mechanism, which includes the cable 16 to which the hand brake rod 15 is secured. The hand brake rod 15 is supported at the rear of the instrument panel 11 by means of a bracket 21 or other suitable means. In order to automatically shift the emergency hand brake rod 15, I provide a vacuum cylinder 22 which is connected to the engine manifold (not shown) through the lines 23 and 23A, and which is open to the atmosphere, as at 24. The vacuum cylinder 22 is provided with a diaphragm 25 which actuates the push-pull rod 26, which in turn actuates the bell crank 27. A vacuum control valve 28 is interposed in the vacuum line 23, the plunger 29 of which (Fig. 4) is connected to a push-pull rod 30, which in turn is pivoted to a lever 31 which is secured to, and swings with the rotation of, the selector rod lever 18. The valve 28 has an opening to the atmosphere, as at 32. The vacuum cylinder 22 and the valve 28 are preferably secured to the fire wall 12 by means of machine screws or other suitable means, as at 33, and 34 (Fig. 5). The brake rod 15 is provided with a hand grip 35 so that it can be manually set in the event of power failure. The hand brake rod 15 is supported, in addition to the bracket 21, by means of a cradle bearing 36 which is fastened to the driver's side of the fire wall 12 by welding or other suitable means. Machined on the rod 15 is a plurality of ratchet teeth 37 which are arranged to be engaged by a locking pawl 38. The pawl 38 is provided with a spring 39 (Fig. 7) which normally urges it into contact with the rod 15. The pawl 38 is pivoted, as at 40, in a pawl carrying member 41 which is formed integrally with a sleeve 42, which is arranged to rotate about the rod 15 and which is held against endwise movement on the rod 15 by means of the end members 36A and 36B of the cradle bearing member 36. The pawl carrying member 41 is connected by means of a link 43 to the upper end 44 of the bell crank 27, which is pivoted, as at 45, to an extension 46 formed on the cradle bearing member 36. The bell crank 27 has a yoke portion 47 through which is extended one end of the rod 15 and to which it is connected by means of a pin 48 which engages a slot 49 formed in the yoke portion 47.

The device operates as follows:

When the selector rod pointer 19 indicates "D" for "Drive," "L" for "Low" or "R" for "Reverse," the parts will be positioned as shown in Figs. 1 and 5. In that position the valve 29 will connect the line 23 to the atmosphere through the line 32 (Fig. 4). This will balance the pressures on both sides of the diaphragm 25, and the diaphragm 25 will move to the position shown in Fig. 2 under the influence of the emergency brake release spring (not shown) which acts through the rod 15, the pin 48, and the bell crank 27. At the same time, the sleeve 42 and the pawl carrier 41 will be rocked downwardly to release the pawl 38 from the ratchet teeth 37. Now when the selector 19 is moved to indicate "N" for "Neutral" or "P" for "Park," the arm 31 through the movement of the lever 18 moves the valve 29, so that there is communication between the line 23 and the line 23A. This puts vacuum on the back of the diaphragm 25 and atmospheric pressure on the opposite side through the opening 24. This causes the diaphragm 25 to move to the position shown in Fig. 3. This in turn pulls the rod 26 and the bell crank 27 to the left, which causes the upward movement of the pawl carrier 41, bringing the pawl 38 into alignment with the teeth 37. As the bell crank 27 continues to move to the left, the pin 48 engages the end of the slot 49, forcing the rod 15 to the left and into emergency brake engaging position. The spring backed pawl 38 will engage one of the ratchet teeth 37 and hold the emergency brake rod 15 in brake engaging position until the sleeve 42 and pawl 38 are again rocked out of locking position and into the position shown in Figs. 1 and 5.

Having described my invention, what I claim and desire to secure by Letters Patent is:

1. In a motor vehicle having an emergency brake mechanism, including a push-pull rod having ratchet teeth thereon, and a speed selector mechanism, including a speed selector indicator and rod, the combination of a bracket for supporting said push-pull rod, a sleeve concentrically mounted for rotation on said push-pull rod, a spring backed pawl carried on an extension on said sleeve and alignable with the said ratchet teeth, a bell crank, one arm of said bell crank having linkage connected to said sleeve and arranged to elevate and lower said pawl into and out of alignment with said teeth, the other arm of said bell crank being connected at one place to said push-pull rod and being connected at another place to the piston of a vacuum cylinder, a control valve for said vacuum cylinder, and linkage from said control valve to the selector rod of said speed selector mechanism.

2. The structure of claim 1, in which the ends of said bracket hold said sleeve against endwise movement on said push-pull rod, and said bracket serves as a support for said belt crank.

3. The structure of claim 1, in which the connection between said bell crank and said push-pull rod has lost motion to cause the movement first of said sleeve by said bell crank before said bell crank moves said push-pull rod.

4. The structure of claim 1, in which the said pawl is held out of engagement with said ratchet teeth by said bell crank when the indicator of said speed selector mechanism is in any driving position and said pawl is held in alignment with said ratchet teeth by said bell crank when the said indicator is in neutral or parking position.

5. The structure of claim 1, in which the said vacuum cylinder is connected to the engine manifold of said motor vehicle.

References Cited in the file of this patent

UNITED STATES PATENTS

| | | |
|---|---|---|
| 2,059,069 | Weiss | Oct. 27, 1936 |
| 2,251,787 | Gardiner | Aug. 5, 1941 |